Figure 1:
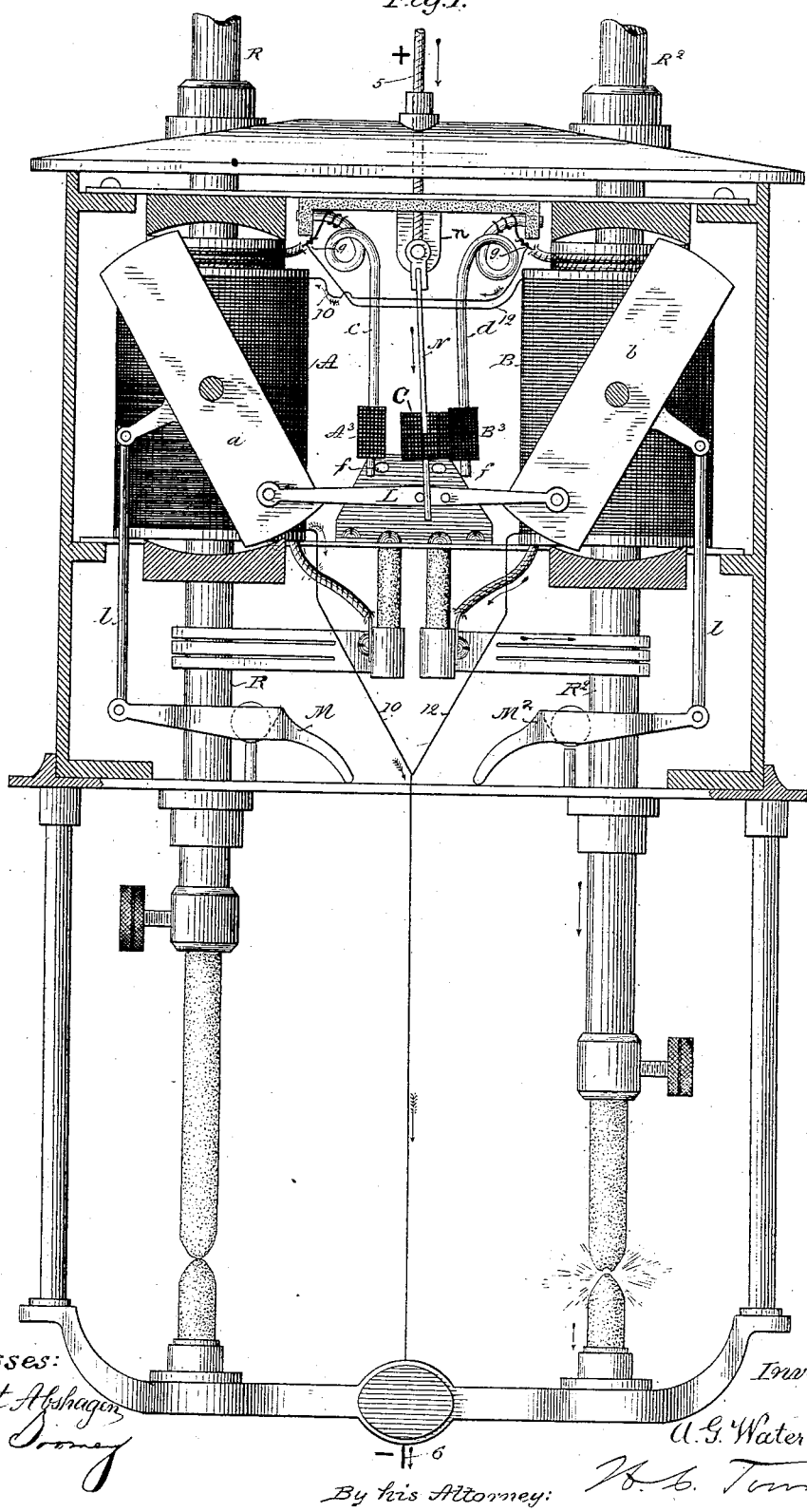

(No Model.)

2 Sheets—Sheet 1.

A. G. WATERHOUSE.
DOUBLE ELECTRIC ARC LAMP.

No. 294,294.

Patented Feb. 26, 1884.

Witnesses:
Ernest Afshagen
Thos. Dooney

Inventor:
A. G. Waterhouse,
By his Attorney:

(No Model.) 2 Sheets—Sheet 2.
A. G. WATERHOUSE.
DOUBLE ELECTRIC ARC LAMP.
No. 294,294. Patented Feb. 26, 1884.
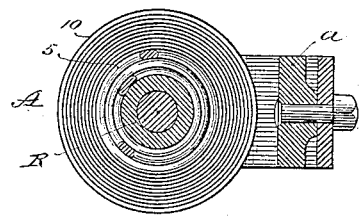
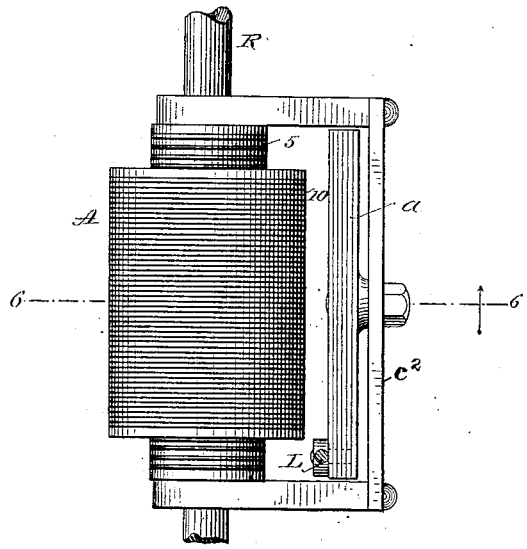
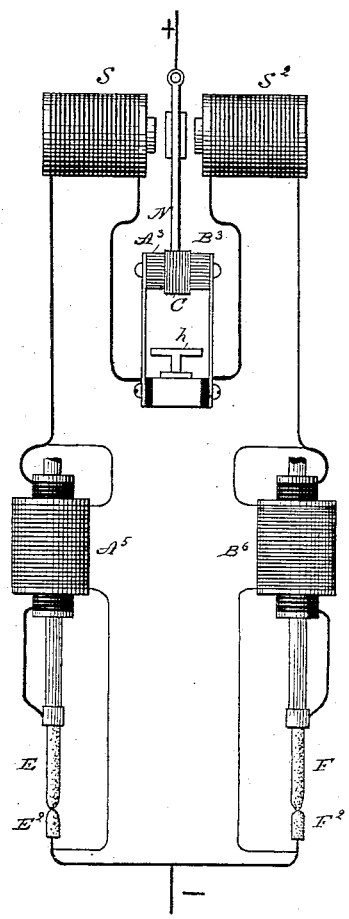
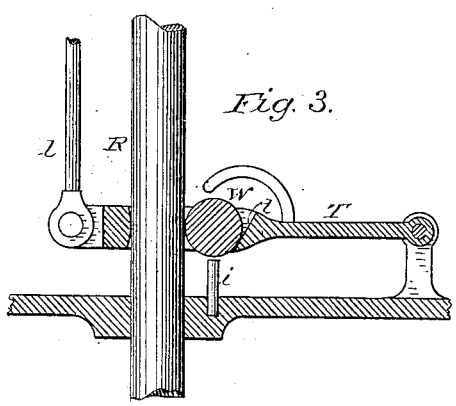
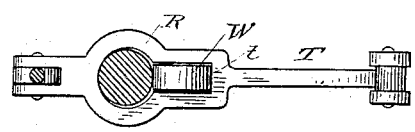
Witnesses:
Ernest Abshagen
Thos. Dooney
Inventor:
A. G. Waterhouse
By his Attorney: H. C. Townsend
N. PETERS, Photo-Lithographer, Washington, D. C.

United States Patent Office.

ADDISON G. WATERHOUSE, OF NEW YORK, N. Y., ASSIGNOR, BY MESNE ASSIGNMENTS, TO THE SCHUYLER ELECTRIC LIGHT COMPANY, OF SAME PLACE.

DOUBLE ELECTRIC-ARC LAMP.

SPECIFICATION forming part of Letters Patent No. 294,294, dated February 26, 1884.

Application filed June 12, 1883. (No model.)

*To all whom it may concern:*

Be it known that I, ADDISON G. WATERHOUSE, a citizen of the United States, and a resident of New York, in the county of New York and State of New York, have invented certain new and useful Improvements in Double Electric-Arc Lamps, of which the following is a specification.

My invention relates to that class of electric-arc lamps in which two or more sets of carbons are employed and the sets are brought into action one after the other as the carbons of the various sets are consumed.

The object of my invention is to provide a simple, effective, and compact lamp, wherein the two sets of carbons ordinarily employed may be automatically switched into and out of circuit by a suitable arrangement of electromagnets, one connected with each set of carbons, said electro-magnets being arranged to act oppositely upon a circuit-controlling device, whereby the one or the other set of carbons may be thrown or switched into circuit, according as the attraction of one or the other of the magnets prevails.

In the simplest form of my invention the magnets that control the operation of the feed mechanism are made to perform the switching operation; but my invention is by no means limited to such an arrangement, and may be also carried out by the employment of electro-magnets, or coils independent of the magnets of the lamp proper, in combination with suitable circuit-controlling apparatus for effecting the desired automatic switching in and out of the sets of carbons.

My invention further consists of a novel arrangement of two lamp-magnets, one for each set of carbons, which magnets are each wound with a coarse and a fine wire, and are provided with mechanically-connected armatures or cores, in combination with a switch mechanism controlled by said magnets, or by other magnets in the circuits with the carbons, whereby the coarse wire on one magnet and the fine wire on the other may be thrown, respectively, into main circuit with and derived circuit around one set of carbons, while at the same time the coarse wire of the last-named magnet and the fine wire of the first may be thrown out by disconnecting or short-circuiting, and vice versa.

My invention further consists in the combination, in a double-carbon lamp, of two magnets, each wound with fine and coarse wire, armatures or cores for said magnets mechanically connected and controlling the feed mechanism of both carbons, and an automatic switch for automatically throwing the coarse wire of one magnet into the main circuit with one set of the carbons, and the fine wire of the other magnet into a derived circuit around said carbons, or, vice versa, the coarse wire of the second magnet into circuit with the other set of carbons, and the fine wire of the first into a derived circuit around said latter carbons.

My invention consists, further, in certain novel combinations of apparatus and devices whereby the objects of my invention are effected.

In the accompanying drawings, Figure 1 is an elevation of one form of electric lamp embodying my invention. Fig. 2 is a side view of one of the magnets. Fig. 3 is a section of the clutch. Fig. 4 is a top view of the same. Fig. 5 illustrates diagrammatically a modification in which the switch is controlled by magnets independent of the lamp-magnets. Fig. 6 is a cross-section of one of the lamp-magnets of Fig. 1.

Referring to Fig. 1, R R² indicate the upper-carbon carriers of a double-carbon electric-arc lamp.

A and B indicate two electro-magnets wound with fine and coarse wire, and having armatures $a$ and $b$, pivoted, as shown in Fig. 2, from a non-magnetic cross-piece, $c^2$, joining the rectangular core projection of the magnets. The cores of the magnets are hollow, as shown in Fig. 6, to form a passage for the carbon-carriers. The armatures swing between the polar projections, and tend to set themselves in right line with the polar projections whenever the magnets are energized. The armatures $a\, b$ are mechanically connected by a link, L, or otherwise, so that they work together as a common system, to impart movements to the regulating mechanisms for the two carbon-carriers. In the present case they are connected by links *l* with lifting and releasing clutches M M²—one for each carbon-carrier—so that when the magnet system acts upon the armatures both clutches will be operated.

Connected with or operated by the armatures *a b* is an electric switch, so connected with the coils of magnets A and B that if the attraction, for instance, of armature *b* prevail over *a*, the connected armatures will move in one direction and throw the coarse wire on B into direct circuit with, say, the carbon-carrier R² and its carbon, and the fine wire on A into a derived circuit around the carbons connected to R², the fine wire on B and the coarse wire on A being at such time cut out or disconnected. On the other hand, if the attraction of magnet A and armature *a* prevail over *b*, the circuit controller or switch will be drawn in the opposite direction, and the coarse wire on A will be thrown into direct circuit with R, and the fine wire on B into a derived circuit around the same, while at the same time the coarse wire on B and the fine wire on A are disconnected.

The armatures *a* and *b* being set or arranged in the manner indicated, it is obvious that under the conditions supposed magnets A and B will respectively act as separate magnets—one a main-circuit and the other a derived-circuit magnet—and the movements of the armatures *a* and *b* under their influence will control the feed-regulating mechanism, as in any differential lamp in which the main and derived circuit magnets are separate. It will, moreover, be apparent that if the electric switch be so arranged as to close the circuits through both magnets A and B and both carbon-carriers R R² when the lamp is out of operation and the carbons in contact, the movement of the switch will be in one direction or the other, according to which of the magnets A B exerts the strongest force upon its armature, and that in this manner the switch will serve to determine which of the two carbons or sets of carbons shall start into operation when the current begins to flow.

The difference in the attractive influence of the two magnets at starting will depend upon various conditions—as, for instance, the difference in the resistance at the point where the two carbons are in contact, the difference in the resistance of the two magnets, &c.—which conditions it is impossible to make the same for both portions of the lamp, so that of necessity the switch will move to one side or the other. To assist in this operation, I propose to so arrange the switch-contacts that the magnets will serve to bring them into closer contact with one another when the switch is drawn to one side or the other, and, as will presently be described, to thus determine positively the movement of the switch and a preponderance of attraction of one magnet so soon as there is a slight disturbance of equilibrium. One form of switch that may be employed for this purpose consists of a suspended contact lever or arm, N, freely suspended from a suitable support, *n*, and carrying a contact-piece, C, of any suitable material, preferably carbon, arranged between two contacts, A³ B³, carried by springs *c d*, which tend to press inward toward contact C, and, when the armatures *a b* are unattracted, will both make contact with the piece C. Movement is imparted to the contact-piece C by the link L, which is for this purpose provided with two pins on opposite sides of the supporting-lever N. Stops *f* are provided for the springs *c* and *d*, and serve to limit the movement of the pieces A³ B³ inward toward contact C, so that when the latter is drawn to one side or the other into contact with A³ or B³, the contact which piece C is moving away from cannot follow it up and remain in contact with it.

The connections are as follows: From main conductor 5 a connection is made with the contact C through its support N, or otherwise. Contact B³ is connected with coarse-wire coil on magnet B, the other end of said coil being connected in any suitable manner with carbon-carrier R², and through the carbons when they are in contact, or through the arc when the lamp is in operation with the continuation 6 of the main conductor. The fine wire on magnet A is in a derived circuit around the carbon of R², the connections for this purpose being made in any desired manner, but preferably from some point between the contact B³ and the upper carbon or R². In the present case the connection is shown as taken from the coarse wire leading to the coarse-wire coil on B at point 9. The derived-circuit connection is indicated by the number 10, and, as usual, joins the main conductor 6 at a point on the other side of the arc. Contact A³ is connected with the coarse wire on A, and through the carbon-carrier R, and the carbons in the usual way with the continuation of the main conductor. The fine wire on B is in a derived circuit around the carbon connected with carrier R in the same manner as the fine wire on A around the carbon of R². The connection is indicated by the wire 12.

The general operation of the device as thus far described is as follows: When no current is passing, the armatures *a b* will be unattracted, and will exert no influence upon the arm N, there being under this condition a substantial balance of the armatures. The clutches M M² will be disengaged from the carrier, and both carbons will be in contact. The contact C will be in an intermediate position between contacts A³ B³, which will both be forced against the intermediate contact by the action of the springs *c d*. Under these conditions the circuit is closed to the coils on both magnets and through both sets of carbons; but the resistance in one path will be slightly less than that in the other—that is, the resistance through C B³ R² and its carbons will not be precisely the same as the resistance through C A³ and its carbon, the difference being due to differences of contact at the switch points or contacts, and the points of the carbons, as well as to other causes. Under these circumstances, when the current is turned on, one magnet will be slightly stronger than the other, and begin to move the link L, say, to the right, and to move the contact C into firmer connection with $B^3$. At the same time clutch $M^2$ will begin to rise, but will not as yet lift its carbon, if the parts are properly adjusted. As the piece C moves to the right, the resistance in the path C $B^3$, &c., decreases, and that through C $A^3$, &c., increases, so that the armature $b$ begins to pull with still greater force, and finally separates C from $A^3$, preserving contact, however, with $B^3$. By this operation the main coil of A and the derived-circuit coil of B, as also carrier R and its carbons, are disconnected from circuit, while the main-circuit wire of B and the fine wire of A in the derived circuit around carrier $R^2$ are retained in circuit, and said magnets A and B may then act in conjunction with the carbons of $R^2$ and their armatures $a b$, the one, A, as a derived-circuit magnet, and the other, B, as a main-circuit magnet, pulling in opposite directions on the feed-regulating devices. In this operation it will be observed that the clutch M is lowered while the clutch $M^2$ is raised, and the latter will finally grip and lift the carbon-carrier $R^2$, so as to form the arc. The feed of the latter will then progress under the control of magnets A B in the usual way, the carrier R being in the meantime at rest, and the carbons of that side of the lamp in contact. If the arc become abnormally long through any derangement in action of the lamp, or through the stoppage of the carrier by means of the usual stop suitably placed to bring it to rest when the carbon has nearly fed out, then the derived-circuit coil on A will become sufficiently strong to move the magnet or armature system in the opposite direction, so as to bring contact C against $A^3$, whereupon the link L will be drawn forcibly to the left, thus disconnecting the main coil on B and the carbon-carrier $R^2$, as well as the derived-circuit coil on A, and placing the coarse-wire coil on A and the carbon-carrier R into direct circuit, and the fine-wire coil on B into derived circuit. The armature system will thereupon lift clutch M and carry R, so as to form the arc, and the feed of carbon-carrier R will be governed in the same way as $R^2$. It is perfectly immaterial which one of the carbon-carriers comes first into action, since the switch will operate in either direction; and if at any time one portion of the lamp fail to feed properly, the other will be switched in, and the currents may be transferred backward and forward from one to the other automatically any desired number of times.

I do not limit myself to any particular construction of switch, nor to any particular mechanism for operating the same from the two magnets, the essence of my invention consisting in automatically switching the two sets of carbons into and out of circuit by means of two switch-magnets acting oppositely upon the switch, and connected, the one with one set of carbons and the other with the other set. Various modifications will readily suggest themselves to those skilled in the art.

The magnets, armatures, and other parts concerned in the operation of the switch might be used solely for the purpose of closing the requisite circuits to the two sets of carbons, and the feed of said carbons controlled by other magnets connected to the main circuit and the carbons in the usual or any suitable manner.

Another arrangement in which the switch-magnets are entirely independent of the lamp-magnets is indicated in Fig. 5, but is more especially designed for use where a single double lamp is used on the circuit of the generator.

S $S^2$ are magnets in separate circuits from contacts $A^3$ $B^3$, one of said circuits passing to a lamp-regulating magnet, $A^5$, controlling the feed of its carbons by any desired means, and the carbons E $E^2$ and the other to a lamp-magnet $B^6$, and other set of carbons, F $F^2$. Magnets $A^5$ $B^6$ are herein indicated as having the usual main and derived circuit coils, which, in the ordinary construction of electric lamps, would be wound separately and oppositely. In the form shown in Fig. 1 the two coils on each magnet may be wound either in the same or the opposite direction, and I generally wind them in the same direction. The stop which prevents the contacts $A^3$ $B^3$ from following up contact C, is indicated in Fig. 5 at $h'$. The supports for $A^3$ $B^3$ are mounted on a suitable block of insulating material, or otherwise insulated from one another.

The feed clamp or clutch which I have shown herein consists, as indicated in Figs. 3 and 4, of a pivoted lever, T, connected with the link $l$, and provided with an enlarged opening, through which carbon-carrier R passes. A clutch-roller, W, rests in the side of the opening and bears against the side of the rod, as well as against the edge of the opening at $t$, so that the carbon-carrier is locked between the opposite side of said opening and the friction-roller, the latter being prevented from revolving by engaging at $t$. A suitable cage prevents the friction-roller from being thrown out of its seat. A stop, $i$, serves to disengage the roller, so as to allow the carrier to slip down when the lever T is lowered.

Other forms of clutch and other constructions of feed-regulating mechanism might be used.

What I claim as my invention is—

1. The combination, substantially as described, in a double-carbon lamp, of two sets of carbons, two magnets, one connected with each set, and a circuit-controlling device upon which said magnets act in opposite directions, so as to determine which of the two sets of carbons with its feed-regulating magnet or magnets shall be in circuit.

2. The combination in a double-carbon lamp, of a reciprocating switch-contact connected to the circuit on one side of the lamp, two switch-contacts or connecting-points, with one or the other of which said reciprocating contact closes the circuit, according to the direction in which it is drawn, and two magnets or coils in circuits respectively from said contacts and acting on said reciprocating contact, as and for the purpose described.

3. The combination, substantially as described, of two sets of carbons arranged in branch or multiple-arc connections, a magnet in each branch, and a circuit-controller that breaks the circuit of one branch and completes the circuit of the other, or vice versa, according to the direction in which it is drawn by said magnets, as and for the purpose described.

4. The combination, in a double-carbon lamp, of two sets of carbons, two magnets, each wound with a coarse and a fine wire, and having mechanically-connected armatures or cores, and a circuit-controller operated by said armatures for completing the circuit through the coarse wire of one magnet and a set of carbons, and through the fine wire of the other in derived circuit around said carbons, while at the same time disconnecting the remaining coarse and fine wires of the two magnets and the other set of carbons, or vice versa, as described.

5. The combination, substantially as described, of two sets of carbons, magnets, or cores—one in connection with each set—and a circuit-controller acted upon by said magnets in opposite directions, for the purpose of completing the circuit through one set of carbons and breaking it to the other, or vice versa, according to which of the two magnets exerts the greater force.

6. The combination of two switch-contacts—one connected with one set of carbons and the other with the other set—two magnets—one in a connection from each contact—an intermediate switch-contact connected with the main circuit, and means connected with the armatures of said magnets for moving said switch-contact in one or the other direction, according to the relative flow of current in the two connections.

7. The combination, with two sets of carbons, of two magnets having mechanically-connected armatures or cores, clamps, or clutches—one for each set of carbons connected with the common armature system—main and derived circuit coils on the magnets, and an electric switch controlled by the armatures for throwing the main-circuit coil on one magnet and the derived circuit on the other into circuit, or vice versa, according to the relative resistance of the two branches, including the switch-contacts and the sets of carbons.

8. The combination, in a double-carbon electric lamp, of magnets A B, each wound with coarse and fine wire, armatures therefor mechanically connected, two switch-contacts on either side of a contact connected with the general circuit, a connection from one of the exterior contacts to the main-circuit or coarse-wire coil on one magnet and the fine-wire coil on the other, and connections from the other contact to the coarse-wire coil of the latter magnet and the fine-wire coil of the first-named magnet, said coarse-wire coils forming each a portion of the main circuit with one set of carbons, and said fine-wire coils being in derived circuits around said carbons.

9. The combination, in a double electric lamp, of a switch-lever working between two swinging contacts, each connected with one of the sets of carbons, magnets—one in each connection from said contacts, and having mechanically-connected armatures acting on said switch-lever—and suitable contact-stops for limiting the movement of the switch-contacts, to prevent them from following and remaining in contact with the switch-lever when it is moved to one side.

10. The combination, substantially as described, of the magnets A B, armatures therefor, contact C, contacts $A^3$ $B^3$ on either side thereof, connected with the fine and coarse wire coils of the magnet in the manner described, and clutches—one for each carrier—operated by the connected armature, as described, so that as one clutch is raised the other is lowered.

11. The combination of the magnets A B, wound with coarse and fine wire, the armatures $a$ $b$, connecting-link for the latter, double contact-switch controlling the circuit of the coarse and fine wire coils in the manner described, clutches M $M^2$, and devices connecting said clutches with the armatures.

12. The combination, with the contact C, connected with the general circuit, of two sets of carbons, two contacts, $A^3$ $B^3$, each connected with a magnet or coil and a set of carbons, and mechanism connected with said magnets for breaking the connection with contact C of either of the contacts $A^3$ $B^3$, and preserving the connection of the other, as and for the purpose described.

13. The combination, with two sets of carbons, of a magnet or coil connected with each set, and a circuit-controlling apparatus operated by said magnets for throwing the two sets of carbons into and out of circuit automatically in accordance with the strength of said magnets as dependent on the resistance between the two carbons of a set.

Signed at New York, in the county of New York and State of New York, this 4th day of June, A. D. 1883.

ADDISON G. WATERHOUSE.

Witnesses:
THOS. TOOMEY,
ERNEST ABSHAGAN.